US012284302B2

(12) United States Patent
Yu

(10) Patent No.: US 12,284,302 B2
(45) Date of Patent: Apr. 22, 2025

(54) ELECTRONIC DEVICE

(71) Applicant: VIVO MOBILE COMMUNICATION CO., LTD., Guangdong (CN)

(72) Inventor: Shuitong Yu, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 366 days.

(21) Appl. No.: 17/949,523

(22) Filed: Sep. 21, 2022

(65) Prior Publication Data

US 2023/0016833 A1 Jan. 19, 2023

Related U.S. Application Data

(63) Continuation of application No. PCT/CN2021/075396, filed on Feb. 5, 2021.

(30) Foreign Application Priority Data

Mar. 30, 2020 (CN) .......................... 202010241344.7

(51) Int. Cl.
*H04M 1/02* (2006.01)
(52) U.S. Cl.
CPC .................................. *H04M 1/026* (2013.01)
(58) Field of Classification Search
CPC .. H04M 1/0235; H04M 1/026; H04M 1/0264; H04M 2250/12; G06F 1/1675; G06F 1/1684; H04N 23/57
See application file for complete search history.

(56) References Cited

U.S. PATENT DOCUMENTS

| 10,993,342 | B2* | 4/2021 | Chen | ........................ H05K 5/02 |
| 2019/0129466 | A1* | 5/2019 | Zeng | ...................... G03B 17/04 |
| 2019/0302841 | A1 | 10/2019 | Sun et al. | |
| 2020/0213491 | A1* | 7/2020 | Huang | .................. H04N 23/60 |

FOREIGN PATENT DOCUMENTS

| CN | 107197133 A | 9/2017 |
| CN | 109862222 A | 6/2019 |
| CN | 109862224 A | 6/2019 |
| CN | 109862237 A | 6/2019 |
| CN | 109951588 A | 6/2019 |
| CN | 109973767 A | 7/2019 |
| CN | 209419667 U | 9/2019 |

(Continued)

OTHER PUBLICATIONS

CN 109862222 A (Year: 2019).*

*Primary Examiner* — Siu M Lee
(74) *Attorney, Agent, or Firm* — Price Heneveld LLP

(57) ABSTRACT

Disclosed is an electronic device, including: a housing, which is provided with an opening; a functional module retractable into the housing or extendable out of the housing through the opening; and a driving mechanism, which is arranged in the housing. The driving mechanism includes a driving source, a lead screw, a nut set, and a caliper. The driving source is drivingly connected to the lead screw. The nut set includes a fitting part, and the fitting part is threadedly fitted with the lead screw. A first end of the caliper is in position-limiting fit with the fitting part, and a second end of the caliper is fixedly connected to the functional module. The cross-sectional shape of the fitting part is a polygon.

9 Claims, 4 Drawing Sheets

(56) References Cited

FOREIGN PATENT DOCUMENTS

| | | | |
|---|---|---|---|
| CN | 110319167 | A | 10/2019 |
| CN | 110324447 | A | 10/2019 |
| CN | 110557482 | A | 12/2019 |
| CN | 209839539 | U | 12/2019 |
| CN | 110730294 | A | 1/2020 |
| CN | 110839125 | A | 2/2020 |
| CN | 111416897 | A | 7/2020 |
| EP | 3518509 | A1 | 7/2019 |
| KR | 20050016770 | A | 2/2005 |
| WO | 2021097946 | A1 | 5/2021 |

\* cited by examiner

ELECTRONIC DEVICE

CROSS-REFERENCE TO RELATED APPLICATIONS

The present invention is a continuation application of PCT International Application No. PCT/CN2021/075396 filed on Feb. 5, 2021, which claims priority to Chinese Patent Application No. 202010241344.7, entitled "ELECTRONIC DEVICE" filed in China on Mar. 30, 2020, which are incorporated herein by reference in their entireties.

TECHNICAL FIELD

The present invention relates to the field of communication technologies, and in particular, to an electronic device.

BACKGROUND

As electronic devices (such as mobile phones and tablet computers) have more and more functions, more and more functional devices are configured on the electronic devices, bringing a great challenge to the assembly of the electronic devices. As demands of users for the appearance of the electronic device are rising, the users are increasingly favoring the electronic device with a large screen-to-body ratio.

Taking a camera as an example, to increase the screen-to-body ratio of the electronic device, a camera of the current electronic device is a lifting camera. The lifting camera is driven by a driving mechanism arranged in the housing of the electronic device, and then enters and exits the housing. When the user needs to photograph, the driving mechanism is controlled to drive the lifting camera to extend out of the housing, and then photograph. After the photographing is completed, the driving mechanism is controlled again to drive the lifting camera to retract into the housing, to hide the camera. The electronic device can prevent the camera from occupying its board space, thereby increasing the screen-to-body ratio of the electronic device.

In current electronic devices, functional components that need to perform telescopic motion in the electronic devices all need to be driven by a driving mechanism. The driving mechanism includes a motor. The motor needs to be equipped with a relatively complex transmission mechanism. The transmission mechanism usually includes a nut guide rod, a spring guide rod, and other structures, which are used for playing a guiding role in the process of driving the functional component to move, to define a running direction of the functional component inside the electronic device. However, these devices all need to occupy space in the electronic device. As a result, the driving mechanism occupies a larger internal space within the electronic device.

SUMMARY

The present invention discloses an electronic device to resolve a problem that a driving mechanism of the electronic device occupies a larger space.

To resolve the foregoing problem, the present invention adopts the following technical solution:

an electronic device, including: a housing, which is provided with an opening; a functional module retractable into the housing or extendable out of the housing through the opening; and a driving mechanism, which is arranged in the housing. The driving mechanism includes a driving source, a lead screw, a nut set, and a caliper. The driving source is drivingly connected to the lead screw. The nut set includes a fitting part, and the fitting part is threadedly fitted with the lead screw. A first end of the caliper is in position-limiting fit with the fitting part, and a second end of the caliper is fixedly connected to the functional module. The cross-sectional shape of the fitting part is a polygon.

The technical solution adopted in the present invention can achieve the following beneficial effects:

In the electronic device disclosed in the present invention, the driving mechanism includes a driving source, a lead screw, a nut set, and a caliper. A first end of the caliper is in position-limiting fit with the fitting part, and the cross-sectional shape of the fitting part is a polygon. Therefore, the rotation of the fitting part will be limited by the caliper, so that the fitting part can drive the caliper to move only along the lead screw, but cannot rotate with the lead screw. Therefore, the structure can transmit the driving force and limit the rotation of the fitting part through the fit between the caliper and the fitting part. The electronic device can dispense with additional structures for guiding, making the driving mechanism occupy a smaller space.

BRIEF DESCRIPTION OF THE DRAWINGS

To describe the technical solutions in the embodiments of the present invention or the background more clearly, the following briefly introduces the accompanying drawings required for describing the embodiments or the background. Apparently, a person of ordinary skill in the art may still derive other drawings from these accompanying drawings without creative efforts.

DESCRIPTION OF REFERENCE NUMERALS IN THE ACCOMPANYING DRAWINGS

100—housing, 110—opening, 200—functional module, 210—bracket, 310—driving source, 320—lead screw, 330—fitting part, 340—connecting plate, 350—elastic member, 351—first elastic member, 352—second elastic member, 360—movable baffle, 370—caliper, 371—linkage recess, 372—avoidance recess.

DETAILED DESCRIPTION

The following clearly describes the technical solutions in the embodiments of the present invention with reference to the accompanying drawings in the embodiments of the present invention. Apparently, the described embodiments are some of the embodiments of the present invention rather than all of the embodiments. All other embodiments obtained by a person of ordinary skill in the art based on the embodiments of the present invention without creative efforts shall fall within the protection scope of the present invention.

Figure 1:
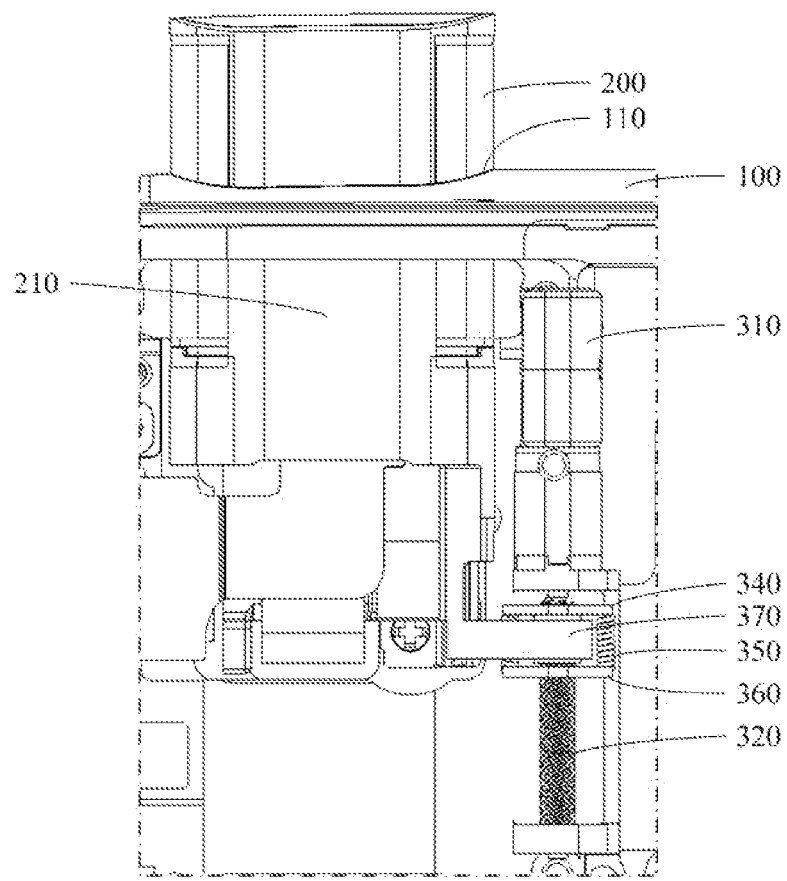
FIG. 1 is a schematic diagram of a partial structure of an electronic device according to an embodiment of the present invention.
Figure 2:
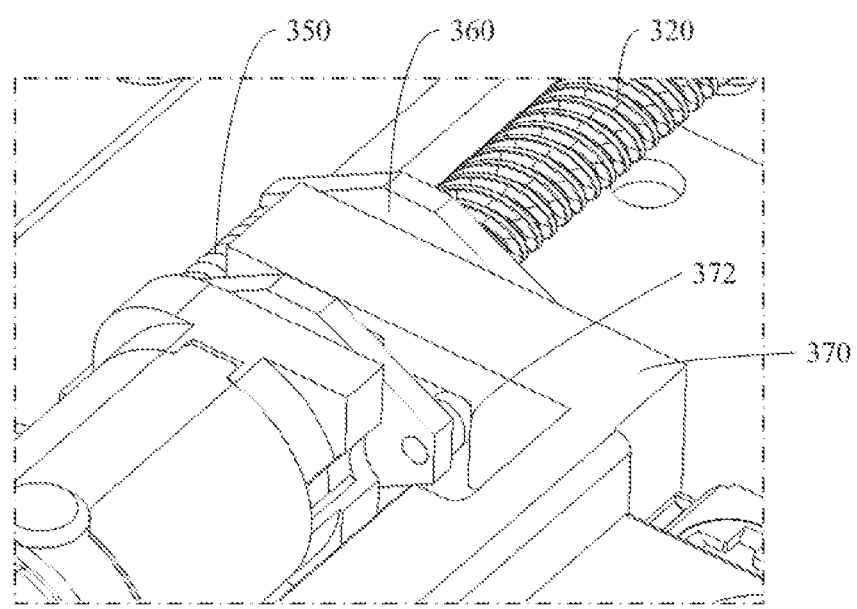
FIG. 2 is a three-dimensional schematic diagram of a partial structure of an electronic device according to an embodiment of the present invention.
Figure 3:
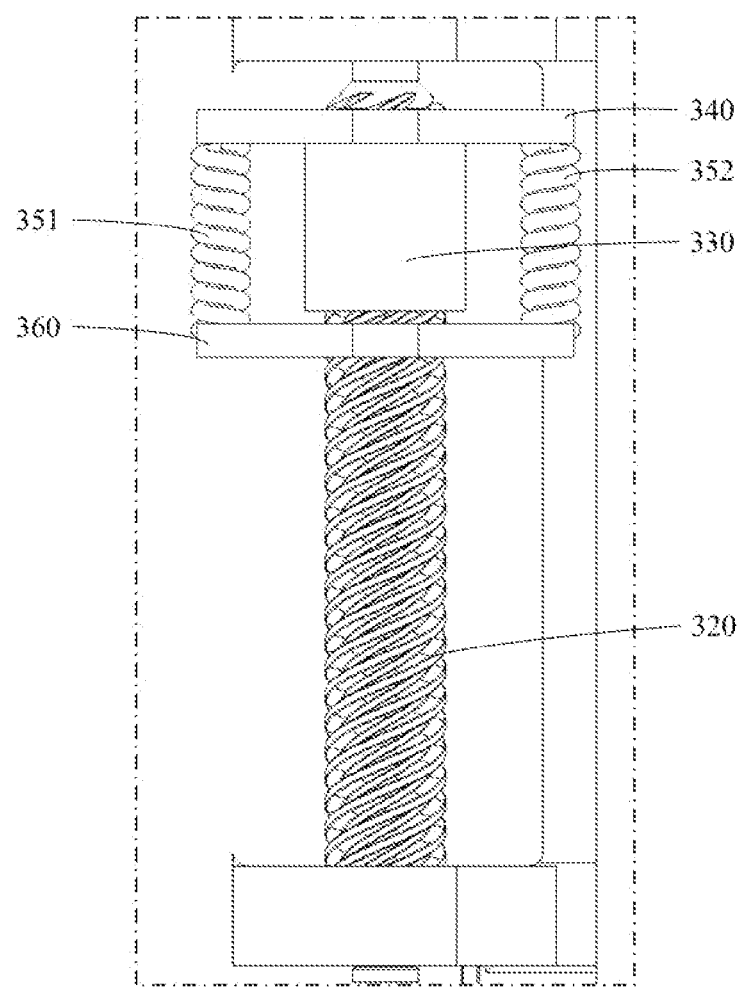
FIG. 3 is a schematic diagram of fit between a lead screw, a fitting part, an elastic member, and a movable baffle in an electronic device according to an embodiment of the present invention.
Figure 4:
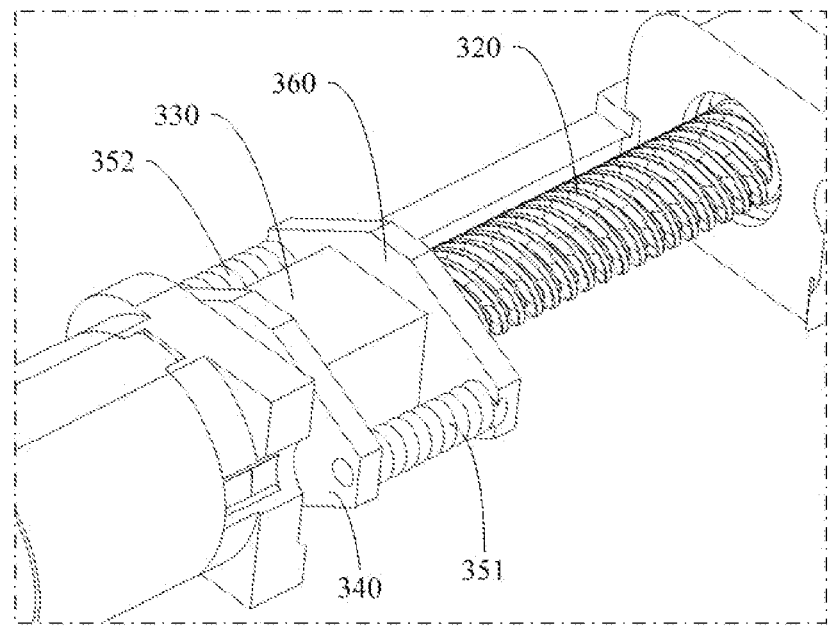
FIG. 4 is a three-dimensional schematic diagram of the structure shown in FIG. 3.
Figure 5:
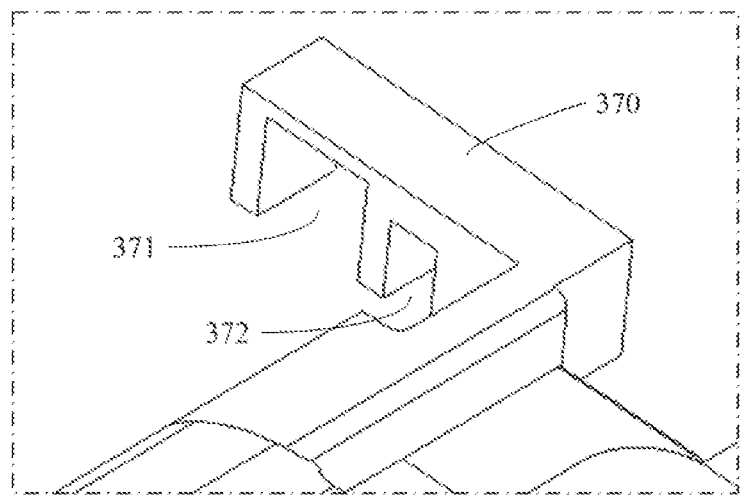
FIG. 5 is a schematic diagram of a partial structure of a functional module in an electronic device according to an embodiment of the present invention.

As shown in FIG. 1 to FIG. 5, the embodiments of the present invention disclose an electronic device, including a housing 100, a functional module 200, and a driving mechanism.

The housing 100 may serve as a main structure of the electronic device, and may provide a mounting base for other components of the electronic device. The housing 100 is provided with an opening 110, and the opening 110 allows the functional module 200 to enter and exit the housing 100. Optionally, the housing 100 may include a frame, and the opening 110 may be arranged on the frame.

The functional module 200 may retract into the housing 100 or extend out of the housing 100 through the opening 110. Optionally, the functional module 200 may include a bracket 210 and a functional device arranged on the bracket 210. When the functional module 200 retracts into the housing 100 through the opening, the functional module 200 may be in a non-working state. In this case, the functional module 200 is hidden in the housing 100. When the functional module 200 extends out of the housing 100 through the opening 110, the functional module 200 may be in a working state. When completing the work, the functional module 200 may retract into the housing 100 through the opening. The functional module 200 may not occupy the display area of the electronic device, so that a screen-to-body ratio of the electronic device may be increased. In addition, the housing 100 does not need to be provided with structures such as a mounting hole corresponding to the functional modules 200, making a better appearance consistency of the electronic device and a better user experience. Optionally, the functional module 200 may include at least one of a camera, a sensor, a fingerprint recognition module, a telephone receiver, and a strobe light. Certainly, the functional module 200 may further include other devices, which are not limited in the embodiments of the present invention.

The driving mechanism is arranged in the housing 100. The driving mechanism includes a driving source 310, a lead screw 320, a nut set, and a caliper 370. The driving source 310 is drivingly connected to the lead screw 320. The nut set includes a fitting part 330, and the fitting part 330 is threadedly fitted with the lead screw 320. A first end of the caliper 370 is in position-limiting fit with the fitting part 330, and a second end of the caliper 370 is fixedly connected to the functional module 200. The cross-sectional shape of the fitting part 330 is a polygon. Correspondingly, the cross-sectional shape of the first end of the caliper 370 may also be a polygon, and the shapes of the two fit in with each other. In this case, the caliper 370 can limit the rotation of the fitting part 330, making the first end of the caliper 370 be in position-limiting fit with the fitting part 330 more reliably. The caliper 370 may fit in with the fitting part 330 in a snap-fit manner, thereby transmitting a force. The caliper 370 and the bracket 210 of the functional module 200 are arranged separately, or may be integrally formed. Relatively speaking, when the caliper 370 and the bracket 210 of the functional module 200 are integrally formed, the force may be transmitted more efficiently.

Optionally, the foregoing driving source 310 may adopt a driving motor, or may adopt a structure capable of outputting a driving force such as a piezoelectric element as long as the driving source 310 can output the driving force to drive the lead screw 320 to rotate. Therefore, the embodiments of the present invention do not limit the specific form of the driving source 310. The driving source 310 may be arranged between the opening 110 and the fitting part 330, making the structure of the driving mechanism more compact. In addition, the cross-sectional shape of the fitting part 330 may be a triangle, a rectangle, a pentagon, a hexagon, an octagon, or the like. Correspondingly, the cross-sectional shape of the first end of the caliper 370 may be a triangle, a rectangle, a pentagon, a hexagon, an octagon, or the like. A person skilled in the art may understand that the shape of the caliper may fit in with the shape of the fitting part 330, that is, if the shape of the fitting part 330 is a quadrilateral, the shape of the caliper 370 is also a quadrilateral. In some other embodiments, the shape of the caliper 370 may alternatively be different from that of the fitting part 330, but it should be ensured that a position where the fitting part 330 has an edge can fit in with a corresponding edge of the caliper 370, and it is necessary to increase a friction force between the two edges to prevent the two from disengaging from each other. The embodiments of the present invention do not limit the cross-sectional shape of the fitting part 330 and the cross-sectional shape of the first end of the caliper 370. It should be noted that the cross-section is parallel to the thickness direction of the electronic device, and is perpendicular to a moving direction of the functional module 200.

When the foregoing solution is adopted, the driving source 310 can drive the lead screw 320 to rotate. The lead screw 320 is threadedly fitted with the fitting part 330, and the caliper 370 can limit the rotation of the fitting part 330. Therefore, driven by the lead screw 320, the fitting part 330 can move along the lead screw 320. The fitting part 330 can transmit the force to the functional module 200 through the caliper 370. Therefore, the functional module 200 can move relative to the housing 100 under the action of the driving mechanism, and then switch between different states.

In the embodiments of the present invention, the cross-sectional shape of the fitting part 330 is a polygon. Therefore, the rotation of the fitting part 330 will be limited by the caliper 370, so that the fitting part 330 can drive the caliper 370 to move only along an extension direction of the lead screw 320, but cannot rotate with the lead screw 320. Therefore, the structure can transmit the driving force and limit the rotation of the fitting part 330 through the fit between the caliper 370 and the fitting part 330. The electronic device can dispense with specific devices for guiding, making the driving mechanism occupy a smaller space. In addition, the weight of the driving mechanism is reduced, thereby reducing the weight of the electronic device, which is more conducive to a light and thin design of the electronic device.

In a further embodiment, the foregoing nut set further includes an elastic member 350 and a movable baffle 360. The movable baffle 360 is connected to the fitting part 330 through the elastic member 350, and the movable baffle 360 is located on a side of the fitting part 330 away from the opening 110. The caliper 370 is slidable relative to the fitting part 330, and the caliper 370 moves along the lead screw 320. In a case that the caliper 370 is at least partially separated from the fitting part 330, the elastic member 350 drives the movable baffle 360 to make the caliper 370 be in contact with the fitting part 330. First, the caliper 370 may slide relative to the fitting part 330 while limiting the rotation of the fitting part 330, so that a certain movement margin may be generated at a position where the two fit in with each other. When the functional module 200 needs to extend out of the housing 100, the lead screw 320 drives the fitting part 330 to move and the fitting part 330 drives the movable baffle 360 to move. When the caliper 370 is in contact with the movable baffle 360, the movable baffle 360 may drive the caliper 370 to move, thereby driving the functional module 200 to move. Second, if the functional module 200 is subjected to an external force, the external force may be transmitted to the movable baffle 360 through the caliper 370, and the movable baffle 360 moves relative to the fitting part 330. In this case, the elastic member 350 may be deformed, thereby reducing the movement amount of the fitting part 330, or even preventing the fitting part 330 from moving, to prevent the external force on the functional module 200 from causing damage to the driving mechanism.

Optionally, the foregoing elastic member 350 may be a spring, or another elastic part.

When the functional module 200 is subjected to the external force, the caliper 370 may be in contact with the movable baffle 360 and drive the movable baffle 360 to move. If the external force on the functional module 200 is relatively large, the movement range of the caliper 370 is relatively large. As a result, the caliper 370 is easily disengaged from the fitting part 330, and a force transmission path between the caliper 370 and the fitting part 330 is cut off. Therefore, to prevent this situation, in an optional embodiment, the electronic device may further include a detection piece and a control piece. The detection piece is arranged in the housing 100. In a case that the caliper 370 is at least partially separated from the fitting part 330, the detection piece is triggered and used for detecting a relative distance between the caliper and the fitting part. The relative distance may be a distance between the center of gravity of the caliper and the center of gravity of the fitting part, or a distance between a first surface of the caliper and a second surface of the fitting part. In a case that the caliper is not separated from the fitting part, the first surface of the caliper and the second surface of the fitting part are coplanar. The control piece is arranged in the housing 100, and the control piece is electrically connected to the detection piece and the driving source 310 respectively. In a case that the detection piece is triggered, the control piece controls the driving source 310 according to a detection result of the detection piece, to cause the driving source 310 to be in a working state. In this embodiment, once the caliper 370 is at least partially separated from the fitting part 330, the detection piece can be triggered to send a relevant signal. The control piece can control the driving source 310 to be in the working state according to the signal, to cause the fitting part 330 to move, so that the fitting part 330 can reliably fit in with the caliper 370. Further, after the control piece controls the driving source 310 to be in the working state, the driving source 310 may drive the functional module 200 to retract into the housing 100 through the caliper 370, thereby preventing the functional module 200 from being continuously subjected to the external force, so as to protect the functional module 200.

The foregoing detection piece may be mounted on the housing 100, and the detection piece is close to the fitting part 330 and the caliper 370, so that a fitting state of the fitting part 330 and the caliper 370 may be accurately learned. In some other embodiments, the detection piece may alternatively be mounted on the fitting part 330, so that the distance between the detection piece and the fitting part 330 and the caliper 370 is smaller, thereby learning the fitting state of the fitting part 330 and the caliper 370 more accurately, and responding to the case that the functional module 200 is subjected to the external force more quickly.

It should be noted that the foregoing detection piece may adopt a position sensor, a proximity switch, or another device. The control piece may be a controller or another device. The embodiments of the present invention do not limit specific types of the detection piece and the control piece.

The movable baffle 360 may be entirely arranged above the lead screw 320. Alternatively, the movable baffle 360 is provided with an avoidance hole, and one end of the lead screw 320 passes through the avoidance hole. In this case, the size of the movable baffle 360 is larger, which can increase a contact area between the movable baffle 360 and the caliper 370, which is conducive to a more reliable transmission of the force between the two, and the movable baffle 360 does not affect the rotation of the lead screw 320. Optionally, the shape of the avoidance hole may fit in with the structure of the lead screw 320. For example, the avoidance hole may be a circular hole, and the diameter of the circular hole may be greater than the outer diameter of the lead screw 320, so that a certain gap may be formed between the two. Certainly, the shape may alternatively be a rectangle, a triangle, or the like.

To bring the elastic member 350 into play more reliably, a plurality of elastic members 350 may be arranged, and include a first elastic member 351 and a second elastic member 352. One end of the first elastic member 351 and one end of the second elastic member 352 are both connected to the movable baffle 360, and the first elastic member 351 and the second elastic member 352 are respectively located on two sides of the lead screw 320. As the number of elastic members 350 increases, the number of connection points between the movable baffle 360 and the fitting part 330 will increase, so that the reliability of the connection between the two is higher and the structure is more stable. In addition, when the functional module 200 is subjected to the external force, a plurality of elastic members 350 may absorb a larger part of the external force, preventing the functional module 200 and the driving mechanism from being damaged.

The elastic member 350 may be directly connected to one end of the fitting part 330 close to the opening 110. When this structure is adopted, since the size of the one end of the fitting part 330 close to the opening 110 is relatively small, the connection between the elastic member 350 and the fitting part 330 is inconvenient. Based on this, in an optional embodiment, the nut set further includes a connecting plate 340. The connecting plate 340 is connected to the one end of the fitting part 330 close to the opening 110; and one end of the first elastic member 351 and one end of the second elastic member 352 are both connected to the fitting part 330 through the connecting plate 340. When the functional module 200 needs to retract into the housing 100 through the opening 110, the driving source 310 drives the fitting part 330 to move through the lead screw 320, and the connecting plate 340 moves accordingly and drives the caliper 370 to move in a direction away from the opening 110, thereby driving the functional module 200 to move into the housing 100.

The connecting plate 340 appropriately increased in size can be more reliably connected to the elastic member 350 and the caliper 370, and make it more convenient for an extension direction of the elastic member 350 to be parallel to the moving direction of the functional module 200, thereby making the elastic member 350 transmit the driving force more efficiently and absorb the external force on the functional module 200 better.

Optionally, the connecting plate 340 and the fitting part 330 may be arranged separately, that is, the two may be separately formed and then assembled together, or the connecting plate 340 and the fitting part 330 are integrally formed, thereby improving the structural strength of the structure formed by the two.

The arrangement positions of the elastic member 350 and the caliper 370 are relatively concentrated, so interference is likely to occur between the two. In view of this, in an optional embodiment, the caliper 370 is provided with an avoidance recess 372, and at least a part of the elastic member 350 is located in the avoidance recess 372. When the avoidance recess 372 is arranged, interference is unlikely to occur between the caliper 370 and the elastic member 350, so the two may be arranged in a more concentrated manner, making the structure formed by the functional module 200 and the driving mechanism more compact, and making the space occupied by the two smaller, which is conducive to the stacking of components within the electronic device.

In a case that the caliper 370 is in position-limiting fit with the fitting part 330, in an optional solution, the caliper 370 may be provided with a fitting hole. The fitting part 330 may fit in with the fitting hole. In another optional solution, the caliper 370 is provided with a linkage recess 371. The linkage recess 371 is in position-limiting fit with the fitting part 330. The linkage recess 371 may first pass through the caliper 370 in a moving direction of the functional module 200, and may further extend to a surface of the caliper 370 in a direction perpendicular to the moving direction. The structure of the linkage recess 371 is similar to that of a groove. Relatively speaking, the linkage recess 371 has fewer limitations on an assembling direction of the caliper 370, so it is convenient to assemble the caliper 370 and the driving mechanism, making the assembly efficiency of the electronic device higher.

The electronic device disclosed in the embodiments of the present invention may be a smartphone, a tablet computer, an e-book reader, a wearable device (such as a smart watch), a video game console, or another device. The embodiments of the present invention do not limit a specific type of the electronic device.

Descriptions of the foregoing embodiments of the present invention focus on a difference between the various embodiments. Provided that different optimization features of the various embodiments do not conflict with each other, a better embodiment may be formed by the combinations of the optimization features, which is not described in detail herein in consideration of the brevity of the text.

The foregoing descriptions are merely embodiments of the present invention and are not intended to limit the present invention. For a person skilled in the art, the present invention may have various changes and modifications. Any modification, equivalent replacement, or improvement made within the spirit and principle of the present invention shall fall within the scope of the claims of the present invention.

What is claimed is:

1. An electronic device, comprising:
    a housing, wherein the housing is provided with an opening;
    a functional module, wherein the functional module is retractable into the housing or extendable out of the housing through the opening; and
    a driving mechanism, wherein the driving mechanism is arranged in the housing, and the driving mechanism comprises a driving source, a lead screw, a nut set, and a caliper; the driving source is drivingly connected to the lead screw; the nut set comprises a fitting part, and the fitting part is threadedly fitted with the lead screw; a first end of the caliper is in position-limiting fit with the fitting part, and a second end of the caliper is fixedly connected to the functional module; and
    the cross-sectional shape of the fitting part is a polygon;
    wherein the nut set further comprises an elastic member and a movable baffle; the movable baffle is connected to the fitting part through the elastic member, and the movable baffle is located on a side of the fitting part away from the opening; the caliper is slidable relative to the fitting part, and the caliper moves along the lead screw; in a case that the caliper is at least partially separated from the fitting part, the elastic member drives the movable baffle to make the caliper be in contact with the fitting part.

2. The electronic device according to claim 1, wherein the electronic device further comprises:
    a detection piece, wherein the detection piece is arranged in the housing; in a case that the caliper is at least partially separated from the fitting part, the detection piece detects a relative distance between the caliper and the fitting part; and
    a control piece, wherein the control piece is arranged in the housing, and the control piece is electrically connected to the detection piece and the driving source respectively; and the control piece controls the driving source according to a detection result of the detection piece.

3. The electronic device according to claim 2, wherein the detection piece is mounted on the fitting part.

4. The electronic device according to claim 1, wherein the movable baffle is provided with an avoidance hole, and one end of the lead screw passes through the avoidance hole.

5. The electronic device according to claim 1, wherein a plurality of elastic members is arranged, and comprises a first elastic member and a second elastic member; one end of the first elastic member and one end of the second elastic member are both connected to the movable baffle, and the first elastic member and the second elastic member are respectively located on two sides of the lead screw.

6. The electronic device according to claim 5, wherein the nut set further comprises a connecting plate; the connecting plate is connected to one end of the fitting part close to the opening; and one end of the first elastic member and one end of the second elastic member are both connected to the fitting part through the connecting plate.

7. The electronic device according to claim 1, wherein the caliper is provided with an avoidance recess, and at least a part of the elastic member is located in the avoidance recess.

8. The electronic device according to claim 1, wherein the caliper is provided with a linkage recess, and the linkage recess is in position-limiting fit with the fitting part.

9. The electronic device according to claim 1, wherein the functional module comprises at least one of a camera, a sensor, a fingerprint recognition module, a telephone receiver, and a strobe light.

* * * * *